April 15, 1941.  J. MIHALYI  2,238,501
AUTOMATIC EXPOSURE MECHANISM FOR SHUTTERS
Filed Jan. 4, 1940  2 Sheets-Sheet 1
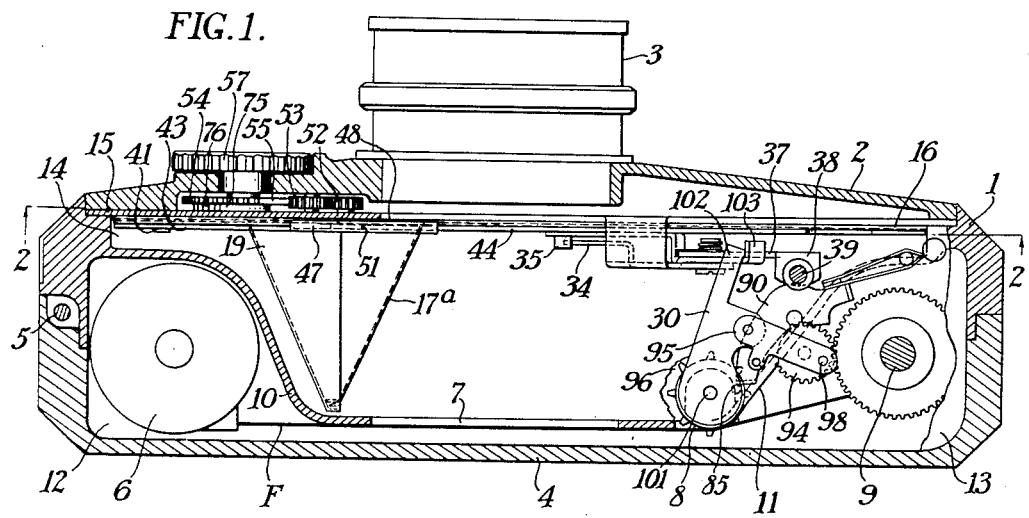
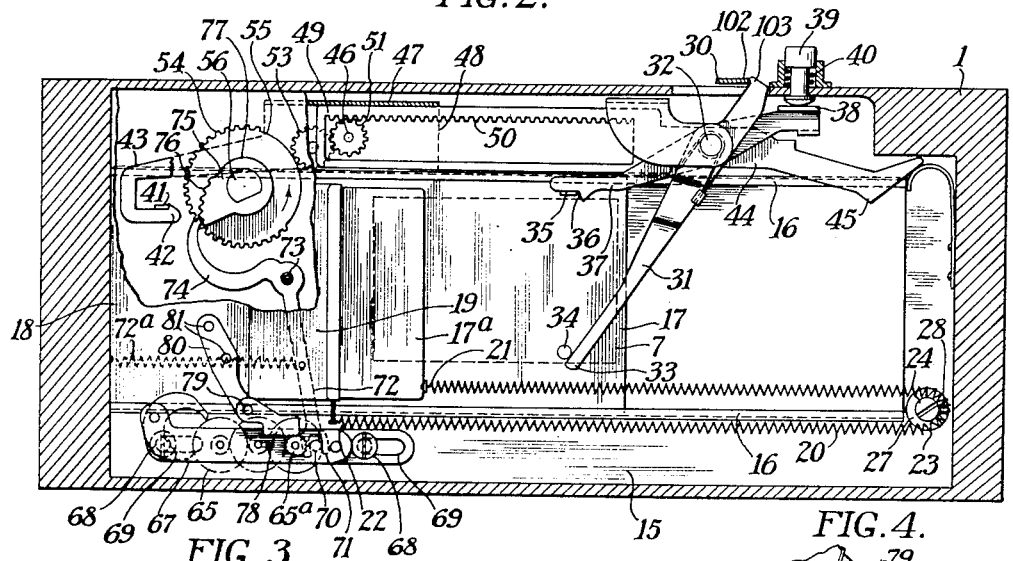
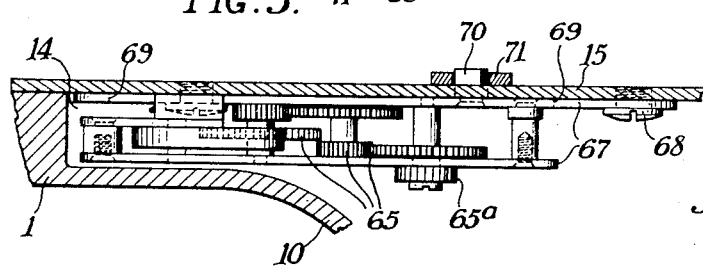
JOSEPH MIHALYI
INVENTOR
BY
ATTORNEYS April 15, 1941.  J. MIHALYI  2,238,501
AUTOMATIC EXPOSURE MECHANISM FOR SHUTTERS
Filed Jan. 4, 1940　　2 Sheets-Sheet 2
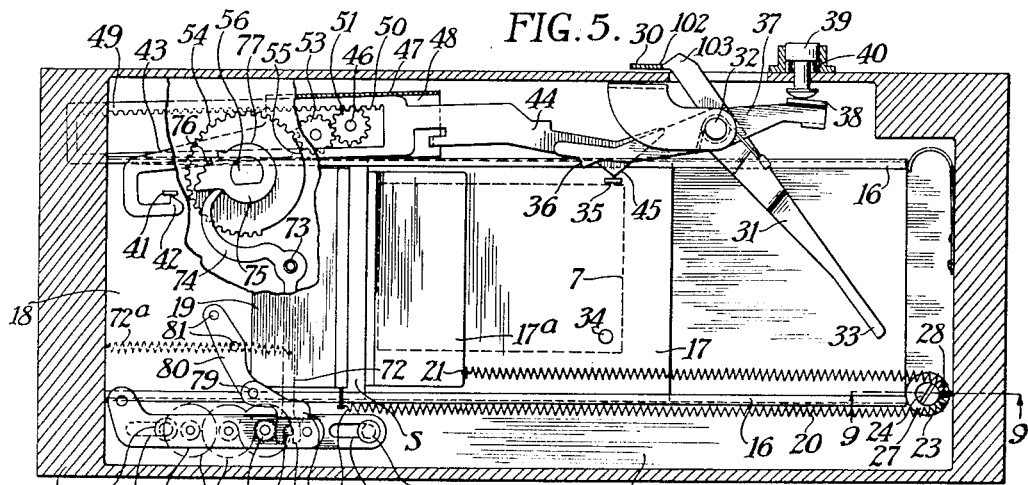
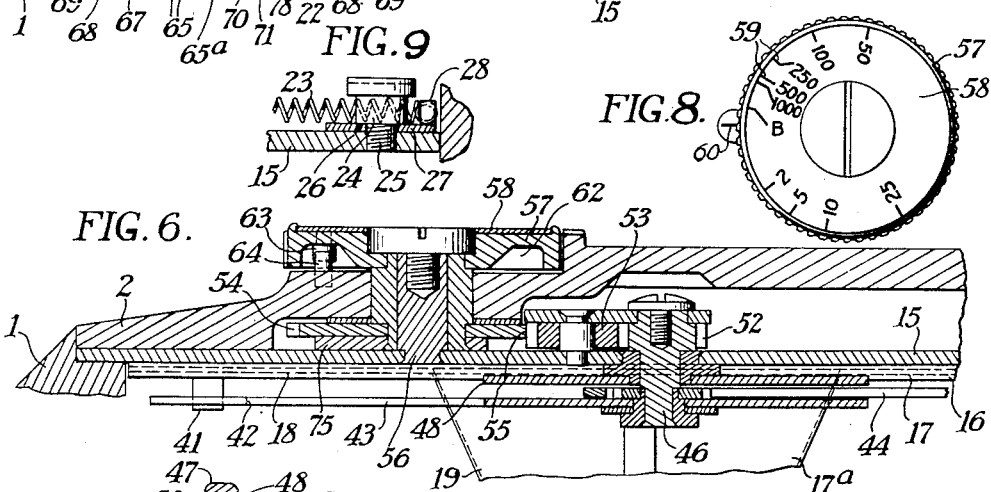
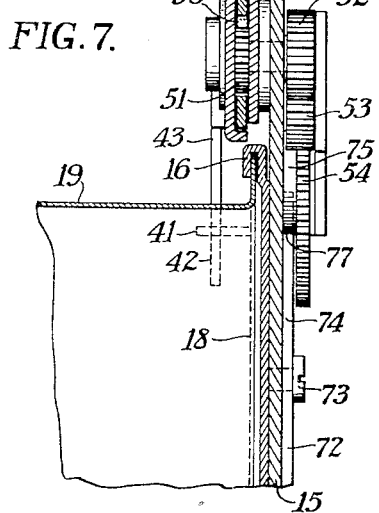
JOSEPH MIHALYI
INVENTOR
BY
ATTORNEYS Patented Apr. 15, 1941

2,238,501

UNITED STATES PATENT OFFICE 2,238,501

AUTOMATIC EXPOSURE MECHANISM FOR SHUTTERS

Joseph Mihalyi, Rochester, N. Y., assignor to Eastman Kodak Company, Rochester, N. Y., a corporation of New Jersey Application January 4, 1940, Serial No. 312,399

9 Claims. (Cl. 95—55)

This invention relates to photography and more particularly to mechanism for producing exposures of different durations in shutters.

One object of my invention is to provide a photographic shutter which can produce a series of automatically controlled exposures, including an extremely fast exposure and a relatively slow exposure. Another object of my invention is to provide an improved means for producing a variety of comparatively slow exposures. Still another object of my invention is to provide two mechanisms for producing predetermined exposures, one mechanism for controlling the relatively fast exposures and the other mechanism for controlling the relatively slow exposures. Still another object of my invention is to provide a single setting dial which will control both mechanisms, and other objects will appear from the following specification, the novel features being particularly pointed out in the claims at the end thereof.

In my copending application for Camera shutters, Serial No. 247,423, filed December 23, 1938, which has issued as Patent No. 2,206,105, dated July 2, 1940, I have shown a camera shutter of the type used in the present embodiment of my invention, except for the control mechanisms which are different in the present application.

Coming now to the drawings, wherein like reference characters denote like parts throughout:

Fig. 1 is a sectional view through a camera including a shutter control constructed in accordance with and embodying a preferred form of my invention.

Fig. 2 is a section on line 2—2 of Fig. 1, showing, in elevation, my improved form of shutter controlling mechanism.

Fig. 3 is a fragmentary sectional view showing a portion of the shutter retarding mechanism.

Fig. 4 is a fragmentary side elevation of a portion of the retard mechanism showing the multi-toothed pawl and ratchet mechanism.

Fig. 5 is a sectional view similar to Fig. 2, in which the shutter is shown just at the moment of release for a relatively fast exposure.

Fig. 6 is an enlarged fragmentary detail section of a portion of the controlling dial and gears used in connection with my improved shutter.

Fig. 7 is a fragmentary sectional view through a portion of the controlling gears and shutter blade mechanism.

Fig. 8 shows, in elevation, a view of the setting dial and pointer removed from the camera.

Fig. 9 is a fragmentary detail section taken on line 9—9 of Fig. 5.

My invention consists broadly in providing two separate mechanisms controlled by a single dial, so arranged that one mechanism may be used to vary the width of the slot between two slidably mounted shutter blades for fast exposures and a second mechanism may render the first mechanism inoperative and may control the duration of longer automatic exposures by means of a suitable retarding device.

Referring to Fig. 1, the camera may be of the type shown in my above mentioned copending application and may consist of a camera body 1, having a front board 2, carrying a lens cell 3, which may be focussed in the usual manner. A camera back 4 may be hingedly attached at 5 to one side of the camera body 1, so that it may be swung open to enable a film F, preferably carried in a retort 6, to be drawn across an exposure frame 7 for exposure and over a film measuring sprocket 8 onto a suitable take-up hub 9.

As is usual with this type of construction, the film may be wound backwardly into the retort 6, after it is completely exposed. The winding handles are well known and are not shown in the present application.

The exposure frame 7 is preferably formed by curved walls 10 and 11 which extend forwardly towards the front plate 2 to form spool chambers 12 and 13. This also leaves a space 14 at each side between the spool chambers and front wall, so that there may be an extremely long slideway for the metal plate focal plane shutter which will now be described. The camera is provided with a mechanism plate 15 which supports a pair of similar rails 16 extending across the major part of the mechanism plate 15 and supporting two shutter plates—a first plate 17 and a second plate 18. Plate 17, as mentioned in my above referred to copending application, is provided with a rearwardly extending forming 17a which mates with a rearwardly extending forming 19 on the plate 18. As these shutter members cross the exposure aperture 17, the slot S (Fig. 5) between the outer edges of the formings 18 and 19 crosses the exposure frame and lies close to a film F passing across it. Thus, while this shutter is mounted on a front plate 15 in the camera, the parts of the shutter closely approach the film and form a focal plane shutter.

From Figs. 2 and 5, it will be noted that a spring means is provided for moving the shutter plates 17 and 18, and I prefer to utilize a single spring 20, having one end 21 attached to the plate 17 and having an opposite end 22 attached to the plate 18. An intermediate portion of this spring 23 is passed around a fixed stud 24, and it is desirable, although not essential, to have this stud in the form shown in Fig. 9, that is, the stud is screwed down by a thread 25 into the mechanism plate 15 and it clamps between the shoulder 26 and the mechanism plate, a washer 27 having an upstanding lug 28. This upstanding lug may engage a convolution of the spring 20 as it passes around the stud, thus, in effect, providing two springs, one for each shutter plate. However, this construction is more advantageous than two springs, because in assembling, it is a relatively simple matter to so assemble the spring 20 with relation to the upstanding lug 28 that like forces may be exerted on the shutter plates 17 and 18, and consequently, these shutter plates may be readily adjusted to move at exactly the same speed. This may be done by merely changing the position of the lug 28 by rotating its washer 27 about the stud 24, or, if the distance the lug 28 may move is insufficient, it is a simple matter to engage a different convolution of the spring 20 with the lug until the two shutter plates are properly balanced.

In order to set the shutter and position it for an exposure, as shown in Fig. 2, there is a lever 30 on top of the camera which is similar to the construction in my above mentioned application. This lever, when swung to the right in Fig. 2 rocks the lever 31 about the pivot 32 so that the end 33 of this lever engages a pin 34 on shutter plate 17. This pin causes the shutter plate 17 to engage and move—through the rearward extensions 17a and 19—the shutter plate 18, and when these two plates are moved to their limit of movement to the left in Fig. 2, a lug 35 on plate 17 will engage a latch 36 on a lever 37, also pivoted on the shaft 32 and having a flange 38 in the path of a trigger 39 normally spring-pressed upwardly by a spring 40.

At the same time, the plate 18 which carries an upstanding lug 41, will be latched by the latch member 42, which is carried by an arm 43, which arm is formed in two pieces, the piece 43 and an elongated extension 44, having a downwardly extending lug 45. This lug forms the tripping member for the latch 42. As soon as the shutter plate 17 is released and the lug 35 passes beneath the latch 36, the plate 17 will move rapidly to the right in Fig. 2 until the lug may strike and raise arm 44, thus causing this arm and the arm 43 to rock on a pivot 46, so that the latch 42 releases the lug 41 so that the second shutter may move.

Therefore, the distance between the latch 42 and the lug 45 controls the slot between the rearward extensions 18 and 19 of the shutter and controls all exposures which depend solely upon a variation in the width of the slot. By adjusting the lug 45 to and from the latch 42, the duration of exposure can be altered.

Referring to Fig. 5, this figure shows the shutter just after the trigger has been depressed and both shutter plates are released. It will be noticed in this form that the lug 45 has been moved until it closely approaches the latch 36. Consequently, the lug 35 had to travel only a very short distance before it struck the lug 45 and caused the latch 42 to release the second shutter. The slot S between the rearward extensions 17 and 18 is comparatively narrow, this indicating that a relatively fast exposure is being made. Both of the shutter plates in Fig. 5 have been released and the spring 20 will cause both of these plates to move at the same speed across the exposure aperture 17.

In order to adjust the position of the extensible arm 43, 44 so that the lug 45 will vary with respect to the latch 42 and also to the latch 36, part 44 is mounted to telescope in part 43, in the following manner: The arm 43, as indicated in Fig. 7, is folded over at 47 and is folded downwardly at 48 to provide a channel for the end 49 of the lever 44. As indicated in Fig. 5, the end 49 of the lever is cut out and is provided with downwardly extending gear teeth 50, adapted to mesh with a pinion 51 mounted on a shaft 46 which constitutes a pivot for the extensible arm and which also carries a pinion 52 coaxially therewith. This pinion is connected to a pinion 53 which, in turn, may mesh with teeth 54 on a gear which has a mutilated portion 55 from which the teeth have been removed. The mutilated gear is carried by a shaft 56 extending through the front wall 2 of the camera and terminating in a knob 57 carrying a speed dial 58 with graduations 59, indicating the various shutter speeds, so that when the dial is turned, and the proper graduation is opposite a pointer 60, the shutter will be set for the selected speed.

It is desirable to prevent the knob 57 from turning more than one revolution, so that I provide a channel 62 on the inside of the dial with a downwardly extending pin 63 which may strike an upwardly projecting pin 64, carried by the camera front 2.

For all relatively fast speeds—here shown from $\frac{1}{50}$ to $\frac{1}{1000}$ of a second, I rely solely upon the action of the spring 20 and the relative adjustments of the shutter plates 17 and 18. For $\frac{1}{1000}$ of a second, the separation between the rearward extensions 18 and 19 is very little, so that a narrow slot S rapidly crosses the exposure aperture E. If one of the slower automatic exposures is to be used, as for instance $\frac{1}{50}$ of a second, the dial 58 is turned until the lug 45 is spaced quite a distance from the latch member 36, so that the shutter member 17 will be released and may complete its travel before the shutter member 18 is released.

I provide a second mechanism for controlling shutter speeds of greater duration than can be controlled solely by the width of the slot between the shutter plates. In the present instance, I have shown exposures from $\frac{1}{25}$ to $\frac{1}{2}$ of a second as being under the control of the second mechanism, although this can be altered by changing the strength of the leaf-operating spring, or by changing the retarding mechanism, or by altering other factors of the shutter.

In the present arrangement, the prolonged exposures may be obtained by bringing a retarding mechanism, here shown as a gear train, designated broadly as 65, into an operative position. This gear train is mounted on a slidable carriage 67 which is provided with slots 68 encircling pins 69. The gear train as a whole may be moved through a pin 70, engaging a fork 71 on a lever 72, pivoted at 73 to the camera and having an arm 74 adapted to engage a cam 75.

In the present instance, I prefer to mount this cam fixedly on shaft 56, and I prefer to provide a series of steps 76, each of which positions the gear train for a definite exposure. If desired, instead of the steps, a smooth cam can be formed, although I find it easier to hold the exact speeds by the structure shown. In addition to the operative stepped portion of the cam, the cam has a surface 77 which is concentric with the shaft 56 and which is inoperative in the sense that when the lever 74 lies on this portion of the cam, the gear train is moved to the inoperative position shown in Fig. 5. It remains in this position during that portion of the turning movement of the knob 57 which controls the relatively fast exposures.

The shutter member 18 is provided with a multi-toothed pawl 78 which is pivoted at 79 to a bracket 80, which, in turn, is riveted at 81 to the shutter plate. This pawl is normally spring-pressed downwardly and is adapted to engage a ratchet wheel 65a.

It is obvious that the degree of engagement of the pawl with the ratchet controls the amount of delay of the shutter plate 18. Thus, when the parts are moved to the position shown in Fig. 2, an exposure of the maximum duration may be made because the multi-toothed pawl must ride across the ratchet, turning the ratchet wheel and with it the entire gearing of the gear train. Thus, after the first shutter plate 17 is released, it moves rapidly to open the exposure aperture E and it is followed by the second shutter plate 18 only after the pawl has worked entirely off the ratchet. By turning the knob 57, the cam 75 is turned, thus moving the gear train on its mount to a predetermined position. A spring 72a tends always to move the lever 72 about the pivot 73 to hold the gear train in the inoperative position shown in Fig. 5. This also causes the end 74 of the lever to contact with the steps or with the smooth surface of the cam.

It will be noted from the above description that when it is desired to produce a fast exposure, say, from $\frac{1}{50}$ to $\frac{1}{1000}$ of a second, the knob 57 is turned to bring the desired graduation opposite the pointer 60, and during this movement, the inactive portion 77 of the cam lies opposite the end 74 of the gear train adjusting lever so that the gear train is held in the inoperative position shown in Fig. 5. When in this position, the sole control of the shutter speed is the adjustment mechanism for the slot S.

When, however, a longer exposure is desired, in which it is necessary to mechanically retard the movement of the second shutter blade, the dial is turned until the stepped part of the cam 75 engages the end of the arm 74 of the gear train adjusting lever 72 so that the ratchet wheel 65a is moved through a fixed path. This path is to and from the path of movement of the multi-toothed ratchet 78 so that one or more teeth of the pawl may be made to engage one or more teeth of the ratchet. If only a tooth of the pawl engages a tooth of the ratchet, the duration of the exposure will be short—say $\frac{1}{25}$ of a second. If, on the other hand, all of the teeth of the ratchet 78 will engage the ratchet wheel, the duration of the exposure will be considerably longer, because the gear train retards the movement of the ratchet wheel and thus delays the closing movement of the shutter.

It should be noticed from Fig. 2 that when the maximum exposure is made, the rearward extension 19 of the shutter plate 18 is spaced from the edge of the exposure frame E a distance so that during the entire engagement of the ratchet with the pawl, and during the slow movement of the shutter blade, being held back by the gear retard, light entering the exposure frame E is not interrupted. In other words, the shutter plate 18 is allowed sufficient over-travel to take care of the pawl and ratchet engagement, and it is only after the pawl leaves the ratchet entirely that the edge 19 of the shutter 18 starts to cut off the exposure.

While it is possible to provide in place of a multi-toothed pawl, a rack, and in place of the ratchet wheel, a gear, I prefer to provide these in the shape shown, because, in setting the shutter, it is unnecessary to rotate the wheels of the gear train, since the pawl may ride idly over the teeth of the ratchet.

What I claim is:

1. In a shutter, the combination with a pair of slidable shutter blades, of means for releasing one shutter leaf after the other for making an exposure, a spring means for operating both shutter blades, a retarding device comprising a slidable mount, a gear train carried thereby, a pivoted toothed arm carried by a slidable shutter blade and moveable thereon through a path, a toothed wheel carried by the gear train, and means for moving the slidable mount to position the toothed wheel relative to the path of movement of the toothed arm.

2. In a shutter, the combination with a pair of slidable shutter blades, of means for releasing one shutter leaf after the other for making an exposure, a spring means for operating both shutter blades, a retarding device comprising a slidable mount, a gear train carried thereby, a pivoted multi-toothed pawl pivotally carried by a slidable shutter blade and moveable through a path therewith, a slidable mount carried by the shutter and carrying a ratchet wheel moveable through a path with the slidable mount, the paths of the pawl and ratchet being parallel and adjacent, and means carried by the camera shutter for varying the length of the path of the ratchet relative to the path of the pawl to determine the degree of retard for an exposure.

3. In a shutter, the combination with a pair of slidable shutter blades, of means for releasing one shutter leaf after the other for making an exposure, a spring means for operating both shutter blades, a retarding device comprising a slidable mount, a gear train carried thereby, a pivoted multi-toothed pawl pivotally carried by a slidable shutter blade and moveable through a path therewith, a slidable mount carried by the shutter and carrying a ratchet wheel moveable through a path with the slidable mount, the paths of the pawl and ratchet being parallel and adjacent, and means carried by the camera shutter comprising a dial, a cam operated by the dial, a lever contacting with the dial and pivotally mounted in the shutter, and operable connections between the lever and the slidable mount for moving the latter by the dial to a position to be engaged by the moveably mounted pawl.

4. In a shutter, the combination with a pair of slidable shutter blades, of means for releasing one shutter leaf after the other for making an exposure, a spring means for operating both shutter blades, a retarding device comprising a slidable mount, a gear train carried thereby, a pivoted multi-toothed pawl pivotally carried by a slidable shutter blade and moveable through a path therewith, a slidable mount carried by the shutter and carrying a ratchet wheel moveable through a path with the slidable mount, the paths of the pawl and ratchet being parallel and adjacent, and means carried by the camera shutter comprising a dial, a cam operated by the dial, means for transmitting movement from the cam to the slidable mount carrying the gear train for varying the pawl and ratchet engagement, a portion of said cam being shaped to prevent engagement of the pawl and ratchet, and a second speed regulating mechanism operable only when the cam holds the slidable mount and gear train out of engagement.

5. In a shutter for cameras, the combination with a track, of a pair of shutter plates slidably mounted on said track, spring means for operating the shutter plates, two mechanisms for producing predetermined exposures, a first mechanism including a trigger, means actuated by the trigger for releasing one shutter plate, adjustable means for varying the time of release of the second shutter after the release of the first shutter plate, a second mechanism including a moveable mount, a retarding device carried thereby, a member carried by a shutter plate for engaging the retard, a cam means for controlling the position of the moveable mount, and a single knob operably connected to both the adjustable means for releasing the second shutter plate of the first mechanism and the cam control of the second mechanism for adjusting the mechanism for a predetermined exposure.

6. In a shutter for cameras, the combination with a track, of a pair of shutter plates slidably mounted on said track, spring means for operating the shutter plates, two mechanisms for producing predetermined exposures, a first mechanism including a trigger, means actuated by the trigger for releasing one shutter plate, adjustable means for varying the time of release of the second shutter after the release of the first shutter plate, a second mechanism including a moveable mount, a retarding device carried thereby, a member carried by a shutter plate for engaging the retard, a cam means for controlling the position of the moveable mount, and a single knob for operating both mechanisms for producing predetermined exposures, said knob including a direct connection to the cam of the second mechanism, and a mutilated gear connection with the first mechanism whereby the latter mechanism may be adjusted only during a predetermined part of the movement of said knob.

7. In a shutter for cameras, the combination with a track, of a pair of shutter plates slidably mounted on said track, spring means for operating the shutter plates, two mechanisms for producing predetermined exposures, a first mechanism including a trigger, means actuated by the trigger for releasing one shutter plate, adjustable means for varying the time of release of the second shutter after the release of the first shutter plate, a second mechanism including a moveable mount, a retarding device carried thereby, a member carried by a shutter plate for engaging the retard, a cam means for controlling the position of the moveable mount, and a single knob for operating both mechanisms for producing predetermined exposures, said knob including a direct connection to the cam of the second mechanism, and a mutilated gear connection with the first mechanism, the mutilated gear being positioned to engage and operate the first mechanism through a predetermined angle of movement of the dial, said cam for the second mechanism being so shaped that said moveable mount and retard are held in an inoperative position except when said mutilated gear is free from engagement with the first mechanism whereby movement of the knob may adjust either one or the other of the two mechanisms.

8. In a shutter for cameras, the combination with a track, of a pair of shutter plates slidably mounted on said track, spring means for operating the shutter plates, two mechanisms for producing predetermined exposures, a first mechanism including a trigger, means actuated by the trigger for releasing one shutter plate, adjustable means for varying the time of release of the second shutter after the release of the first shutter plate, and comprising a latch member, a toothed rack carried thereby, gearing connected to said rack including a mutilated gear carried by a dial, teeth on the mutilated gear for moving the rack between two limits of movement and a toothless portion which may pass teeth of the gearing after the rack has been moved to one limit of movement, a cam operably connected to the mutilated gear, a retarding device movable by the cam to and from an operative position in which it may retard a shutter plate and constituting a second retarding mechanism, the surface of the cam being so shaped that the second retarding device may only be operatively positioned when the rack controlling the first mechanism for producing predetermined exposures is moved to one extent of movement.

9. In a shutter for cameras, the combination with a track, of a pair of shutter plates slidably mounted on said track, spring means for operating the shutter plates, two mechanisms for producing predetermined exposures, a first mechanism including a trigger, means actuated by the trigger for releasing one shutter plate, adjustable means for varying the time of release of the second shutter after the release of the first shutter plate, and comprising a latch member, a toothed rack carried thereby, gearing connected to said rack including a mutilated gear carried by a dial, teeth on the mutilated gear for moving the rack between two limits of movement and a toothless portion which may pass teeth of the gearing after the rack has been moved to one limit of movement, a cam operably connected to the mutilated gear, a retarding device moveable by the cam to and from an operative position in which it may retard a shutter plate and constituting a second retarding mechanism, the surface of the cam being so shaped that the second retarding device may be operatively positioned only when said mutilated gearing is in position to disconnect the rack, and a single knob operatively connected to the mutilated gear for selecting the desired exposures.

JOSEPH MIHALYI.